United States Patent
Wang

(10) Patent No.: US 8,903,018 B2
(45) Date of Patent: Dec. 2, 2014

(54) COMMUNICATION SYSTEM AND CONTROL CIRCUIT THEREIN

(75) Inventor: Yin-Tsai Wang, New Taipei (TW)

(73) Assignee: Wistron Corp., New Taipei (TW)

( * ) Notice: Subject to any disclaimer, the term of this patent is extended or adjusted under 35 U.S.C. 154(b) by 142 days.

(21) Appl. No.: 13/604,667

(22) Filed: Sep. 6, 2012

(65) Prior Publication Data

US 2014/0023124 A1 Jan. 23, 2014

(30) Foreign Application Priority Data

Jul. 18, 2012 (TW) .............................. 101125743 A

(51) Int. Cl.
*H03C 7/00* (2006.01)

(52) U.S. Cl.
USPC ............ 375/315; 375/297; 375/309; 375/311

(58) Field of Classification Search
USPC ................................................ 375/295–315
See application file for complete search history.

(56) References Cited

U.S. PATENT DOCUMENTS

| | | | | |
|---|---|---|---|---|
| 2002/0083207 | A1* | 6/2002 | Andersen | ....................... 709/249 |
| 2005/0130595 | A1* | 6/2005 | Shurvinton et al. | ....... 455/67.11 |
| 2005/0251234 | A1* | 11/2005 | Kanzius et al. | ............... 607/101 |
| 2007/0194878 | A1 | 8/2007 | Touge et al. | |
| 2008/0261544 | A1* | 10/2008 | Blin | .............................. 455/121 |
| 2011/0014886 | A1 | 1/2011 | Manssen et al. | |
| 2012/0071108 | A1* | 3/2012 | Yang et al. | ....................... 455/68 |
| 2012/0295555 | A1* | 11/2012 | Greene et al. | .................... 455/77 |

FOREIGN PATENT DOCUMENTS

CN 102573126 A 7/2012

* cited by examiner

*Primary Examiner* — Sam K Ahn
*Assistant Examiner* — James M Perez
(74) *Attorney, Agent, or Firm* — Birch, Stewart, Kolasch & Birch, LLP

(57) ABSTRACT

A communication system includes a baseband processor, an RF (Radio Frequency) transceiver, a power amplifier, an antenna, and a control circuit. The power amplifier generates an amplified signal. The control circuit includes a coupler, an AC-to-DC (Alternating Current to Direct Current) converter, a comparator, and an attenuator. The coupler generates a transmission signal and a coupling signal according to the amplified signal. The AC-to-DC converter is coupled to the coupler, and converts the coupling signal into a DC (Direct Current) signal. The comparator compares a DC voltage of the DC signal with a reference voltage so as to generate a control signal. The attenuator is coupled between the coupler and the antenna, and attenuates or does not attenuate the transmission signal according to the control signal.

14 Claims, 3 Drawing Sheets

COMMUNICATION SYSTEM AND CONTROL CIRCUIT THEREIN

CROSS REFERENCE TO RELATED APPLICATIONS

This Application claims priority of Taiwan Patent Application No. 101125743 filed on Jul. 18, 2012, the entirety of which is incorporated by reference herein.

BACKGROUND OF THE INVENTION

1. Field of the Invention

The disclosure generally relates to a communication system, and more particularly, relates to a communication system for reducing SAR (Specific Absorption Rate).

2. Description of the Related Art

With the progress of mobile communication technology, portable electronic devices, for example, portable computers, mobile phones, multimedia players, and other hybrid functional portable electronic devices, have become more common. To satisfy the demand of users, portable electronic devices usually can perform wireless communication functions. Some functions cover a large wireless communication area, for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area, for example, mobile phones using Wi-Fi, Bluetooth, and WiMAX (Worldwide Interoperability for Microwave Access) systems and using frequency bands of 3.5 GHz, 5.2 GHz, and 5.8 GHz.

However, current portable electronic devices can not prevent users from being exposed to electromagnetic waves. For example, when a wireless communication operation is performed, a mobile phone transmits electromagnetic waves which are near to a head of a user, for a mobile phone. Therefore, governments have formulated criterion as to how much electromagnetic waves is safe for a human body to absorb, such as specific absorption rate, or the so-called SAR criterion. SAR is a measure of the rate at which energy is absorbed by the human body when exposed to a RF (Radio Frequency) electromagnetic field. It is defined as the power absorbed per mass of tissue and has units of watts per kilogram (W/kg). In Taiwan, the criterion of SAR in electronic devices is similar to Europe, below 2 W/kg.

BRIEF SUMMARY OF THE INVENTION

In one exemplary embodiment, the disclosure is directed to a communication system, comprising: a baseband processor, generating a baseband signal; an RF (Radio Frequency) transceiver, modulating the baseband signal so as to generate an RF signal; a power amplifier, amplifying the RF signal so as to generate an amplified signal; an antenna; and a control circuit, comprising: a coupler, generating a transmission signal and a coupling signal according to the amplified signal; an AC-to-DC (Alternating Current to Direct Current) converter, coupled to the coupler, and converting the coupling signal into a DC (Direct Current) signal; a comparator, comparing a DC voltage of the DC signal with a reference voltage so as to generate a control signal; and an attenuator, coupled between the coupler and the antenna, and attenuating or not attenuating the transmission signal according to the control signal.

In another exemplary embodiment, the disclosure is directed to a control circuit for use in a communication system, comprising: a coupler, generating a transmission signal and a coupling signal according to an amplified signal; an AC-to-DC (Alternating Current to Direct Current) converter, coupled to the coupler, and converting the coupling signal into a DC (Direct Current) signal; a comparator, comparing a DC voltage of the DC signal with a reference voltage so as to generate a control signal; and an attenuator, coupled to the coupler, and attenuating or not attenuating the transmission signal according to the control signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
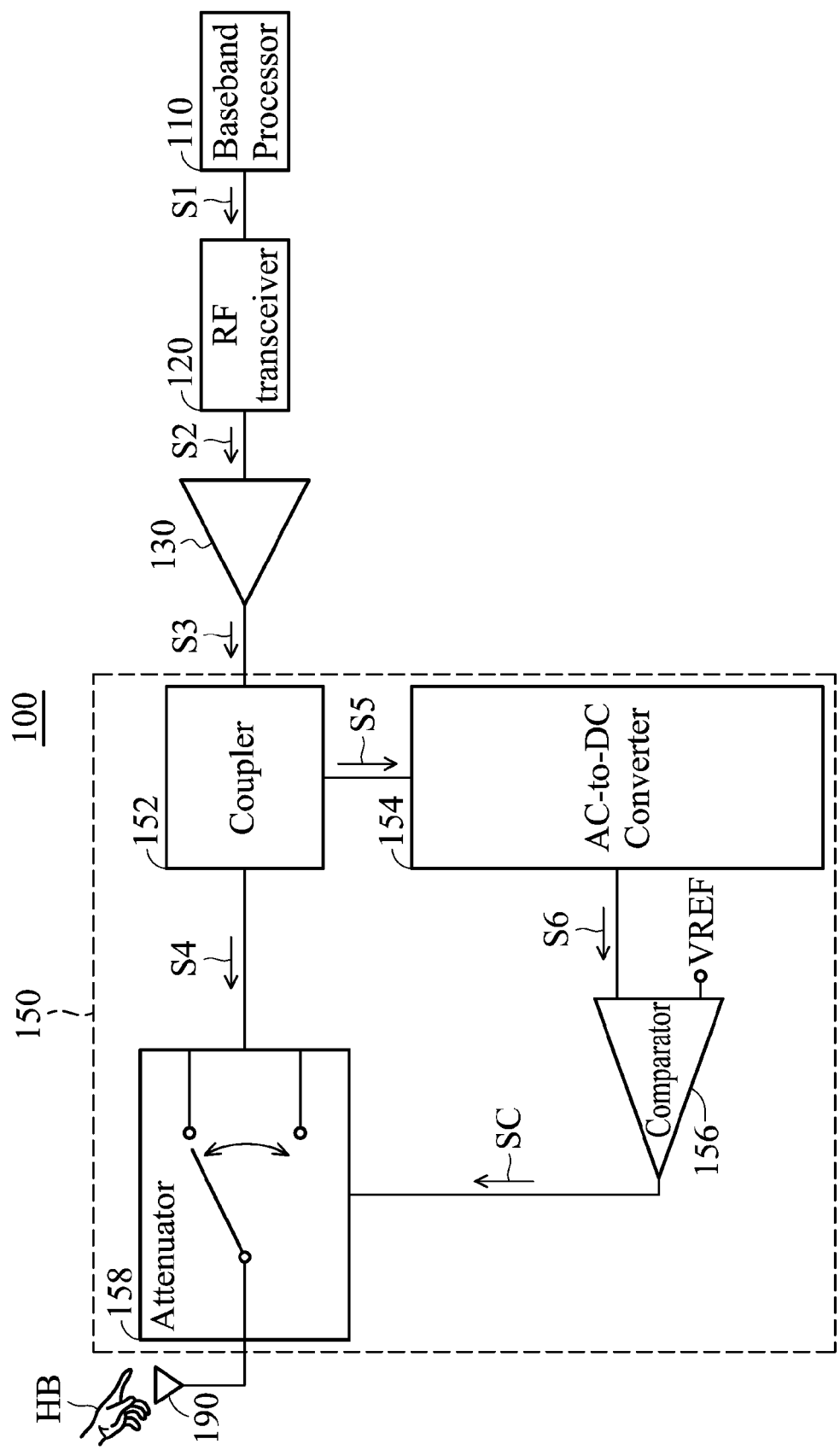
FIG. 1 is a diagram for illustrating a communication system according to an embodiment of the invention.

FIG. 1 is a diagram for illustrating a communication system 100 according to an embodiment of the invention. As shown in FIG. 1, the communication system 100 comprises a baseband processor 110, an RF (Radio Frequency) transceiver 120, a power amplifier 130, a control circuit 150, and an antenna 190. The baseband processor 110 generates a baseband signal S1. The RF transceiver 120 modulates the baseband signal S1 so as to generate an RF signal S2. Then, the power amplifier 130 amplifies the RF signal S2 so as to generate an amplified signal S3. In a preferred embodiment, the RF signal S2 and the amplified signal S3 are both AC (Alternating Current) signals.

The control circuit 150 comprises a coupler 152, an AC-to-DC (Alternating Current to Direct Current) converter 154, a comparator 156, and an attenuator 158. The coupler 152 generates a transmission signal S4 and a coupling signal S5 according to the amplified signal S3. More particularly, the transmission signal S4 is almost the same as the amplified signal S3, and the waveform of the coupling signal S5 is similar to the waveform of the amplified signal S3 but the magnitude of the coupling signal S5 is usually smaller than the magnitude of the amplified signal S3. The AC-to-DC converter 154 is coupled to the coupler 152, and converts the AC coupling signal S5 into a DC (Direct Current) signal S6. Next, the comparator 156 compares a DC voltage of the DC signal S6 with a reference voltage VREF so as to generate a control signal SC. The attenuator 158 is coupled between the coupler 152 and the antenna 190. The attenuator 158 further attenuates or does not attenuate the transmission signal S4 according to the control signal SC. Finally, the antenna 190 transmits the attenuated or non-attenuated transmission signal S4.

When a conductor HB (e.g., a metal element or a human body) is close to the antenna 190, an antenna impedance of the antenna 190 is changed such that an output power of the power amplifier 130 is changed. At the time, the SAR (Specific Absorption Rate) of the communication system 100 may not meet the safety criterion. In the invention, the control circuit 150 can detect the output power of the power amplifier 130 automatically and solve the foregoing problem.

Since the coupling signal S5 is similar to the amplified signal S3 which is generated by the power amplifier 130, the comparator 156 can determine whether the output power of the power amplifier 130 is changed according to the converted DC signal S6. In a preferred embodiment, when the DC voltage of the DC signal S6 is not equal to the reference voltage VREF (this represents that the output power is changed), the comparator 156 controls the attenuator 158 to attenuate the transmission signal S4 by a factor, such as 6 dB or 10 dB. On the contrary, when the DC voltage of the DC signal S6 is equal to the reference voltage VREF (this represents that the output power has not been changed), the comparator 156 controls the attenuator 158 not to attenuate the transmission signal S4. In some embodiments, the comparator 156 is a Smith trigger, and the reference voltage VREF is set after the communication system 100 or the control circuit 150 has been calibrated.

In a preferred embodiment, when the conductor HB is away from the antenna 190, the attenuator 158 does not attenuate the transmission signal S4 such that the communication system 100 maintains a normal transmission power. When the conductor HB is close to the antenna 190, the attenuator 158 attenuates the transmission signal S4 by a factor such that the SAR of the communication system 100 meets the safety criterion.

Figure 2:
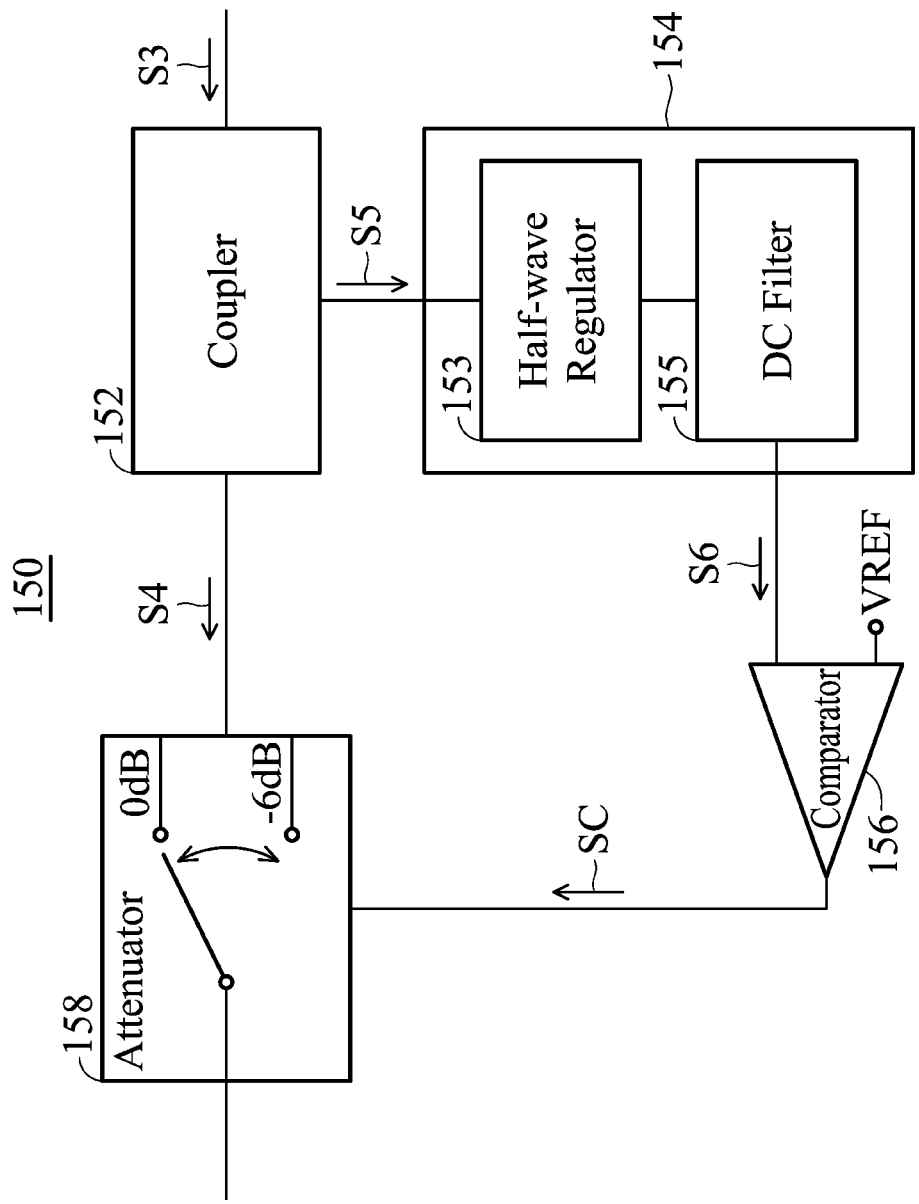
FIG. 2 is a diagram for illustrating a control circuit according to an embodiment of the invention.

FIG. 2 is a diagram for illustrating the control circuit 150 according to an embodiment of the invention. As shown in FIG. 2, the AC-to-DC converter 154 comprises a half-wave regulator 153 and a DC filter 155. The half-wave regulator 153 and the DC filter 155 can process the AC coupling signal S5 so as to generate the DC signal S6. In the embodiment, the attenuator 158 can select one of two different factors, such as 0 dB and 6 dB. When 0 dB is selected, it is represented that the attenuator 158 does not attenuate the transmission signal S4. Note that the invention is not limited to the above. In other embodiments, the attenuator 158 may have more attenuating factors, such as 0 dB, 6 dB, and 10 dB.

Figure 3:
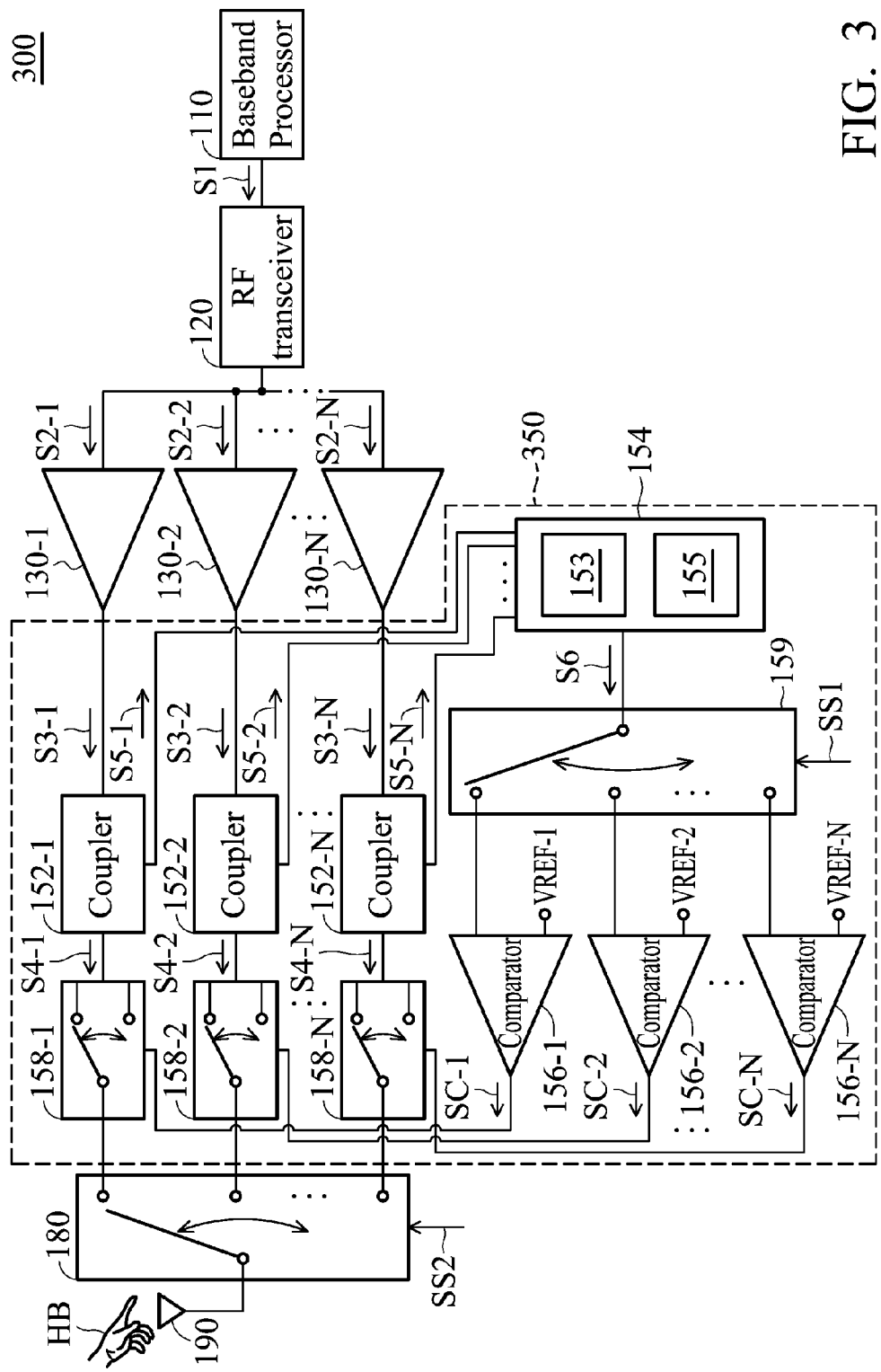
FIG. 3 is a diagram for illustrating a communication system according to another embodiment of the invention.

FIG. 3 is a diagram for illustrating a communication system 300 according to another embodiment of the invention. Generally, a mobile device comprising a communication system usually operates in different bands, such as GSM850/900, GSM1800/1900, WCDMA, and LTE bands. Therefore, the communication system 300 comprises a plurality of communication paths, which correspond to different operation bands, respectively.

As shown in FIG. 3, the communication system 300 comprises a baseband processor 110, an RF transceiver 120, a plurality of power amplifiers 130-1, 130-2, . . . , and 130-N, a control circuit 350, a selection circuit 180, and an antenna 190. N is a positive integer which is greater than or equal to 2. In the embodiment, the control circuit 350 comprises a plurality of couplers 152-1, 152-2, . . . , and 152-N, an AC-to-DC converter 154, a selection circuit 159, a plurality of comparators 156-1, 156-2, . . . , and 156-N, and a plurality of attenuators 158-1, 158-2, . . . , and 158-N. The communication system 300 is similar to the communication system 100 in FIG. 1. The only difference between the two embodiments is that the communication system 300 can select one of a plurality of operation bands.

In the embodiment, the RF transceiver 120 generates a plurality of RF signals S2-1, S2-2, . . . , and S2-N according to a baseband signal S1, wherein the RF signals S2-1, S2-2, . . . , and S2-N corresponds to a plurality of operation bands. The power amplifiers 130-1, 130-2, . . . , and 130-N are respectively coupled to the RF transceiver 120, and amplify the RF signals S2-1, S2-2, . . . , and S2-N so as to generate a plurality of amplified signals S3-1, S3-2, . . . , and S3-N. The couplers 152-1, 152-2, . . . , and 152-N are respectively coupled to the power amplifiers 130-1, 130-2, . . . , and 130-N, and generate a plurality of transmission signals S4-1, S4-2, . . . , and S4-N and a plurality of coupling signals S5-1, S5-2, . . . , and S5-N according to the amplified signals S3-1, S3-2, . . . , and S3-N. The couplers 152-1, 152-2, . . . , and 152-N are further respectively coupled to the AC-to-DC converter 154.

Note that the communication system 300 only uses one communication path at a time. In other words, the RF transceiver 120 selectively generates a single RF signal to enter the used communication path. Therefore, the AC-to-DC converter 154 merely converts one coupling signal into the DC signal S6, wherein the coupling signal corresponds to the used communication path.

The comparators 156-1, 156-2, . . . , and 156-N have a plurality of reference voltages VREF-1, VREF-2, . . . , and VREF-N, which correspond to a plurality of operation bands. In some embodiments, the reference voltages VREF-1, VREF-2, . . . , and VREF-N are set after the communication system 300 or the control circuit 350 has been calibrated. The selection circuit 159 selectively couples one of the comparators 156-1, 156-2, . . . , and 156-N to the AC-to-DC converter 154 according to a selection signal SS1. The selection signal SS1 is generated according to the used communication path by the baseband processor 110. The comparators 156-1, 156-2, . . . , and 156-N compare a DC voltage of the DC signal S6 with the reference voltages VREF-1, VREF-2, . . . , and VREF-N so as to generate a plurality of control signals SC-1, SC-2, . . . , and SC-N. As mentioned above, the comparators 156-1, 156-2, . . . , and 156-N merely generate a single control signal at a time. The attenuators 158-1, 158-2, . . . , and 158-N are respectively coupled to the couplers 152-1, 152-2, . . . , and 152-N, and attenuate or does not attenuate the transmission signals S4-1, S4-2, . . . , and S4-N according to the control signals SC-1, SC-2, . . . , and SC-N. In addition, the selection circuit 180 selectively couples one of the attenuators 158-1, 158-2, . . . , and 158-N to the antenna 190 according to another selection signal SS2. Similarly, the selection signal SS2 is also generated according to the used communication path by the baseband processor 110. Finally, the antenna 190 transmits one of the attenuated or non-attenuated transmission signals S4-1, S4-2, . . . , and S4-N. Therefore, the communication system 300 in FIG. 3 can also adjust the output power appropriately, and has a similar function to that of the communication system 100.

In the invention, the communication system and the control circuit therein can determine whether a conductor is close to the antenna according to the output power of the power amplifier, and then dynamically adjust the transmission power of the communication system so as to reduce SAR. The invention does not use any traditional proximity sensor to detect a conductor nearby so as to effectively reduce cost and save design space.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication system, comprising:
   a baseband processor, generating a baseband signal;
   an RF (Radio Frequency) transceiver, modulating the baseband signal so as to generate an RF signal;
   a power amplifier, amplifying the RF signal so as to generate an amplified signal;
   an antenna; and
   a control circuit, comprising:
      a coupler, generating a transmission signal and a coupling signal according to the amplified signal;
      an AC-to-DC (Alternating Current to Direct Current) converter, coupled to the coupler, and converting the coupling signal into a DC (Direct Current) signal, wherein the AC-to-DC converter comprises a half-wave regulator and a DC filter;
      a comparator, comparing a DC voltage of the DC signal with a reference voltage so as to generate a control signal; and
      an attenuator, coupled between the coupler and the antenna, and the attenuator is configured to selectively attenuate the transmission signal by a factor as dependent upon the comparator control signal, and the attenuator is also configured to selectively not attenuate the transmission signal as dependent upon the comparator control signal,
      wherein when a conductor is close to the antenna, an antenna impedance of the antenna is changed such that an output power of the power amplifier is changed using the comparator control signal of the attenuator to attenuate the transmission signal by the factor, and
      wherein the factor is selectively set to values substantially equal to 6 dB and 10 dB.

2. The communication system as claimed in claim 1, wherein when the conductor is away from the antenna, the comparator controls the attenuator not to attenuate the transmission signal.

3. The communication system as claimed in claim 1, wherein when the DC voltage of the DC signal is not equal to the reference voltage, the comparator controls the attenuator to attenuate the transmission signal by the factor, and wherein when the DC voltage of the DC signal is equal to the reference voltage, the comparator controls the attenuator not to attenuate the transmission signal.

4. The communication system as claimed in claim 1, wherein the power amplifier is a first power amplifier, the RF signal is a first RF signal, the RF transceiver further generates one or more second RF signals, and the communication system further comprises:
   one or more second power amplifiers, respectively coupled to the RF transceiver, and amplifying the second RF signals, respectively.

5. The communication system as claimed in claim 4, wherein the coupler is a first coupler, and the control circuit further comprises:
   one or more second couplers, respectively coupled to the second power amplifiers.

6. The communication system as claimed in claim 5, wherein the comparator is a first comparator, the reference voltage is a first reference voltage, the second couplers are further coupled to the AC-to-DC converter, and the control circuit further comprises:
   one or more second comparators, having one or more second reference voltages; and
   a first selection circuit, selectively coupling one of the first comparator and the second comparators to the AC-to-DC converter according to a first selection signal, wherein the first selection signal is generated by the baseband processor.

7. The communication system as claimed in claim 6, wherein the first reference voltage and the second reference voltages are set after the communication system has been calibrated.

8. The communication system as claimed in claim 6, wherein the attenuator is a first attenuator, and the control circuit further comprises:
   one or more second attenuators, respectively coupled to the second couplers, and controlled by the second comparators.

9. The communication system as claimed in claim 8, further comprising:
   a second selection circuit, selectively coupling one of the first attenuator and the second attenuators to the antenna according to a second selection signal, wherein the second selection signal is generated by the baseband processor.

10. A control circuit for use in a communication system with an antenna and a power amplifier for amplifying a Radio Frequency (RF) signal so as to generate an amplified signal, the control circuit comprising:
    a coupler, generating a transmission signal and a coupling signal according to the amplified signal;
    an AC-to-DC (Alternating Current to Direct Current) converter, coupled to the coupler, and converting the coupling signal into a DC (Direct Current) signal, wherein the AC-to-DC converter comprises a half-wave regulator and a DC filter;
    a comparator, comparing a DC voltage of the DC signal with a reference voltage so as to generate a control signal; and
    an attenuator, coupled between the coupler and the antenna, and the attenuator is configured to selectively attenuate the transmission signal by a factor as dependent upon the comparator control signal, and the attenuator is also configured to selectively not attenuate the transmission signal as dependent upon the comparator control signal,
    wherein when a conductor is close to the antenna, an antenna impedance of the antenna is changed such that an output power of the power amplifier is changed using the comparator control signal of the attenuator to attenuate the transmission signal by the factor, and
    wherein the factor is selectively set to values substantially equal to 6 dB and 10 dB.

11. The control circuit as claimed in claim 10, wherein when the DC voltage of the DC signal is not equal to the reference voltage, the comparator controls the attenuator to attenuate the transmission signal by the factor, and wherein when the DC voltage of the DC signal is equal to the reference voltage, the comparator controls the attenuator not to attenuate the transmission signal.

12. The control circuit as claimed in claim 10, wherein the comparator is a first comparator, the reference voltage is a first reference voltage, the coupler is a first coupler, and the control circuit further comprises:
    one or more second couplers, coupled to the AC-to-DC converter;
    one or more second comparators, having one or more second reference voltages; and
    a selection circuit, selectively coupling one of the first comparator and the second comparators to the AC-to-DC converter according to a selection signal.

13. The control circuit as claimed in claim 12, wherein the attenuator is a first attenuator, and the control circuit further comprises:
   one or more second attenuators, respectively coupled to the second couplers, and controlled by the second comparators.

14. The control circuit as claimed in claim 12, wherein the first reference voltage and the second reference voltages are set after the control circuit has been calibrated.

* * * * *